(No Model.)
F. S. FAHNESTOCK.
POTTED PLANT SUPPORT.
No. 385,174. Patented June 26, 1888.
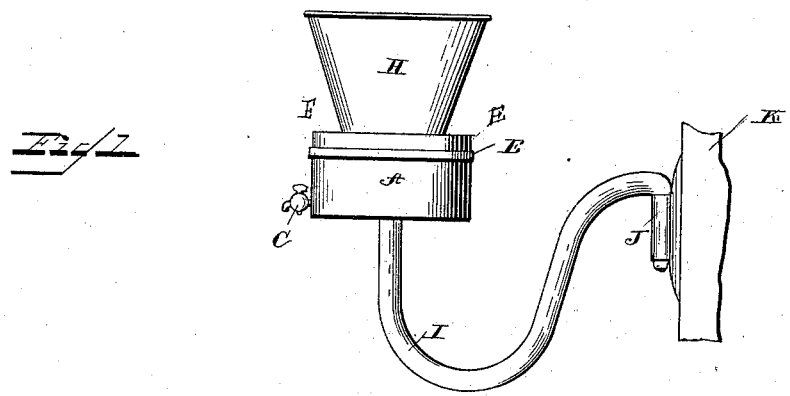
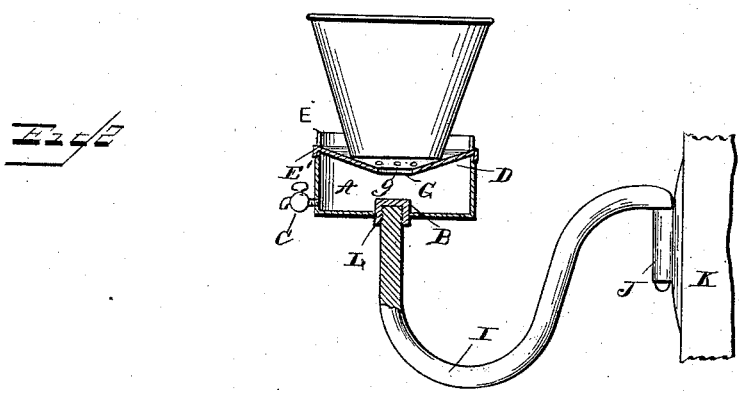
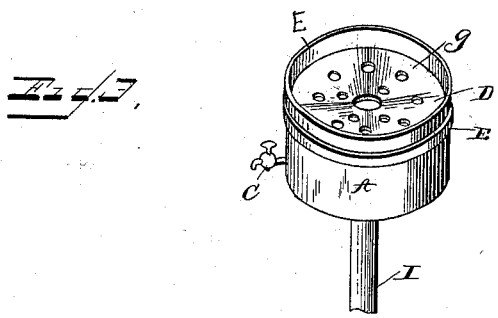
WITNESSES.
John Imirie.
J. P. Coleman.
INVENTOR.
Fredrick S. Fahnestock.
Frank A. Fouts, *Attorney*.

UNITED STATES PATENT OFFICE.

FREDRICK S. FAHNESTOCK, OF COHOES, NEW YORK.

POTTED-PLANT SUPPORT.

SPECIFICATION forming part of Letters Patent No. 385,174, dated June 26, 1888.

Application filed October 21, 1887. Serial No. 253,028. (No model.)

*To all whom it may concern:*

Be it known that I, FREDRICK S. FAHNESTOCK, a citizen of the United States, residing at Cohoes, in the county of Albany and State of New York, have invented certain new and useful Improvements in Potted-Plant Supports; and I do hereby declare the following to be a full, clear, and exact description of the invention, such as will enable others skilled in the art to which it appertains to make and use the same.

My invention is a support for potted plants; and it consists in the parts, which will be hereinafter described, and pointed out in the claim.

The object of the invention is to provide a support for potted plants, so that the plants may be placed in a window or other desired position, and to prevent the water from dripping on anything liable to be soiled, and also to permit the waste water to be drawn off and used again.

In the accompanying drawings, Figure 1 is a side elevation of my invention. Fig. 2 is a like elevation with the support and part of the bracket in section, and Fig. 3 is a perspective view of the support and a fragment of the bracket to which it is engaged.

Like letters indicate like parts in the several views.

A is a pan provided on its under side with a central opening. Rigidly secured to the pan and filling said opening is a nut, B, internally screw-threaded.

C is a cock having a hollow screw-threaded stem opening into the pan. The pan is open at the top.

D is a perforated concavo-convex plate. This plate is provided on its outer edge with two circumferential flanges, E E', the flange E extending upward. The plate aforesaid rests on the top rim of the pan, and it is secured thereto by means of the flange E'. Said plate is provided with a large central opening, G, and a series of smaller openings, $g$. H is a pot for plants. This pot rests upon the plate D.

I is a bracket pivoted to a plate, J, said plate being secured to a wall, K. The outer end of the bracket is screw-threaded, as at L, to engage the internal screw-threads on the nut B, whereby the device is firmly secured to the bracket.

Having thus described my invention, I claim as new and desire to secure by Letters Patent of the United States—

A potted-plant support consisting of the pan A, having the screw-nut B secured in the bottom thereof, a bracket having a screw-threaded outer end, said outer end being in engagement with the screw-nut aforesaid, and the cock C in the side of the pan, in combination with the plate D, provided with an upwardly and a downwardly extending flange, as specified, said plate being perforated, substantially as described, and for the purposes set forth.

In testimony whereof I affix my signature in presence of two witnesses.

FREDRICK S. FAHNESTOCK.

Witnesses:
WILLIAM E. SEAPORT,
T. E. BULSON.